T. KAJIWARA.
CAMERA.
APPLICATION FILED NOV. 18, 1914.
1,153,392.
Patented Sept. 14, 1915.
2 SHEETS—SHEET 2.
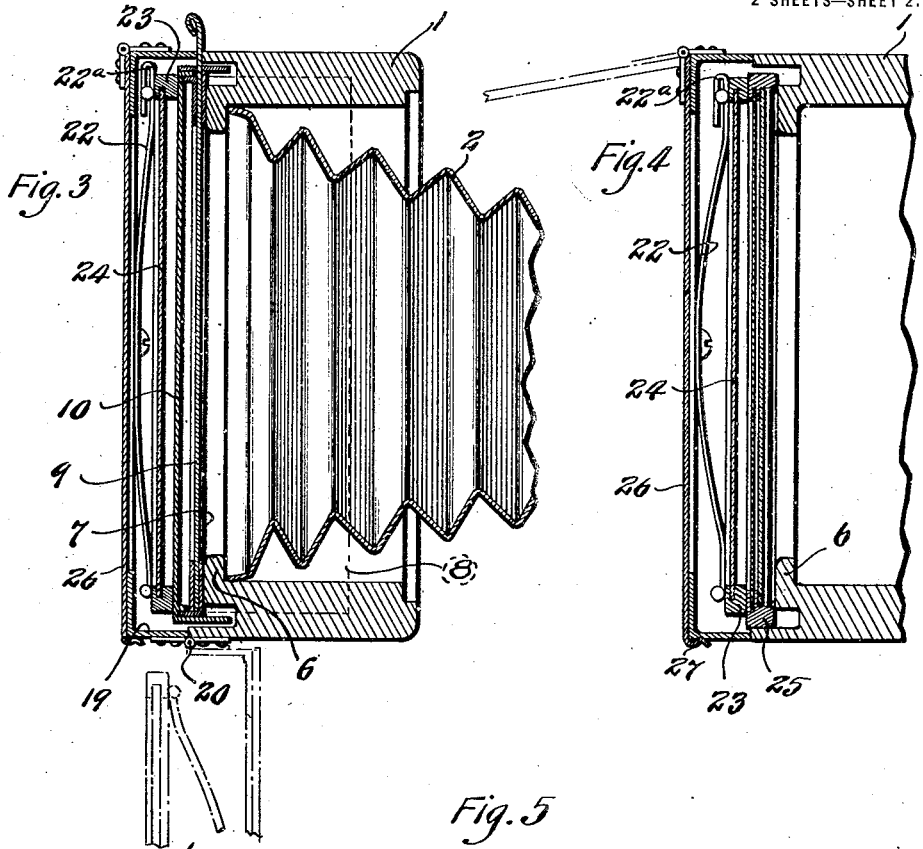
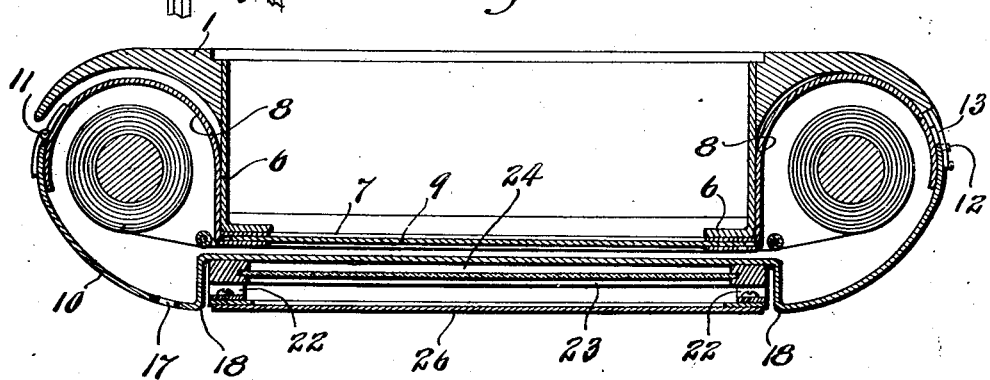
Witnesses
Wm. Janus
Inventor
Takuma Kajiwara
By F. R. Cornwall, Atty.

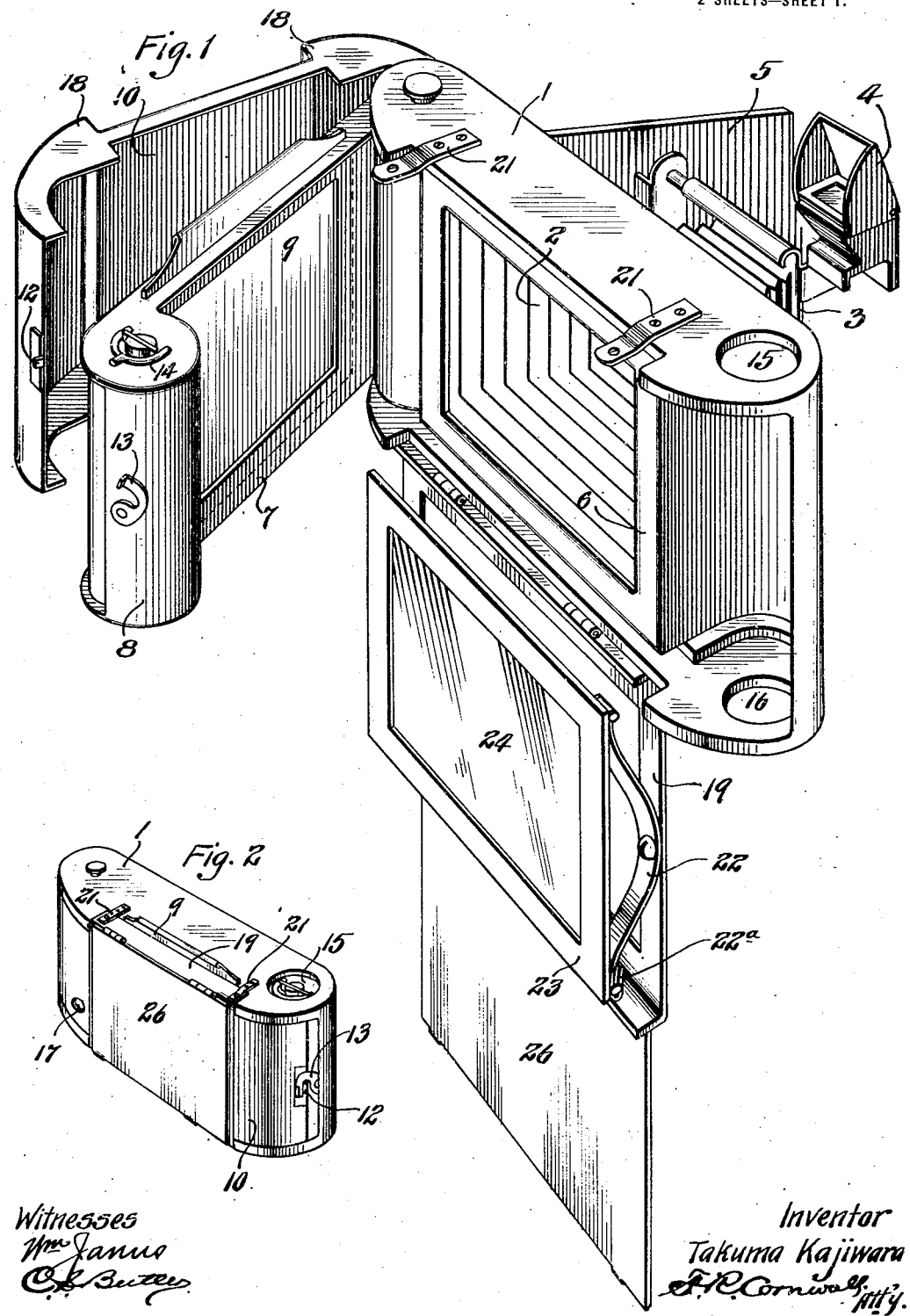

UNITED STATES PATENT OFFICE.

TAKUMA KAJIWARA, OF ST. LOUIS, MISSOURI.

CAMERA.

1,153,392. Specification of Letters Patent. Patented Sept. 14, 1915.

Application filed November 18, 1914. Serial No. 872,758.

*To all whom it may concern:*

Be it known that I, TAKUMA KAJIWARA, a subject of the Emperor of Japan, residing at the city of St. Louis, State of Missouri, have invented a certain new and useful Improvement in Cameras, of which the following is a full, clear, and exact description, such as will enable others skilled in the art to which it appertains to make and use the same, reference being had to the accompanying drawings, forming part of this specification, in which—

Figure 1 is a perspective view of my improved camera showing the parts opened. Fig. 2 is a detail view showing the parts closed. Fig. 3 is a vertical sectional view through the box portion of the camera when the same is in condition to utilize the film. Fig. 4 is a similar view when the camera is in condition to use a plate. Fig. 5 is a horizontal sectional view.

This invention relates to a new and useful improvement in cameras commonly known as folding pocket cameras, the object being to construct a camera so that it may employ either rolled films or plates.

Another object of my invention is to construct a camera so that it may be focused and the exposure made on the film.

In the drawings, I have shown my invention as applied to a folding pocket Eastman kodak, but it is obvious that the same is useful in connection with other types of cameras.

1 indicates what may be designated as the camera box, to which is attached the usual bellows 2 carrying the lens frame 3 at its forward end, on which is mounted the finder 4 as is commonly employed in cameras of this sort. It is understood that the finder cover may be folded down, and the cover 5 which carries the track for the lens frame may be closed, as shown in Fig. 2, as is commonly resorted to in cameras of this kind; but, as stated before, my invention is applicable to other types of cameras, and the details heretofore described form no part of my present invention. However, with this understanding, I will describe my invention as being applicable to this particular type of camera which, as is well known, at the rear end of the bellows is provided with a film supporting frame 6, at each side of which is a spool receptacle for the rolled film. These films are purchasable in the open market, and usually in folding pocket cameras of the type illustrated, the spool of the exhausted film is taken from its receptacle at the left hand side of the camera (in the position shown in the drawings) and placed in its receptacle at the right hand side where it is engaged by the wings of the stud shaft having a handle on its outer end, which stud shaft coöperates with a clutch to prevent winding the spool in the wrong direction. The filled spool containing the film to be exposed is introduced into the receptacle at the left hand side of the camera and the black backing paper carried across and its end inserted in the slot in the exhausted spool, after which the back of the camera box is placed in position and the clutch handle wound until the operator is notified, first by hand, and then by a number, that the film is in position for an exposure. I shall not describe the details of the spool mounts and clutch handle, as those are well known, but I will state in this connection that the frame which contains the spools in my construction is preferably pivoted at the left hand side of the camera on an axis coincident with the stud pins on which the unexposed film spool is mounted. This frame is divided as shown in Fig. 1, the inner portion 7 thereof having at each end spool housings 8, and an opening in its central part preferably coincident in size with the opening defined by the frame 6. This inner frame 7 is also provided with guideways in which a cover plate 9 may be inserted, said cover plate preferably extending upwardly and provided with a hand hold by which it may be inserted into or removed from position.

10 is the outer wall of the movable spool containing frame which is hinged at 11 to the inner frame 7. This outer frame is appropriately shaped and provided with a keeper 12 at its free edge which coöperates with a latch 13 on the inner frame, by means of which these two frames may be secured together. The clutch handle 14 for winding up the film is mounted in the top wall of the free edge of the inner frame and when folded down, as shown in Fig. 1, passes under the top wall of the camera box until it is exposed by an opening 15 therein. The bottom wall of the camera is also preferably provided with an opening 16 to expose the button head by which the stud or pin on which the empty spool is mounted, may be manipulated.

To load the camera, an empty spool is placed in position in the housing 8 at the right hand side and in engagement with the stud to which the clutch handle 14 is connected. The filled spool is placed in the left hand side and the black backing paper drawn over and its end inserted in the slot in the empty spool. The back frame is now closed and latched in position when the handle 14 may be manipulated to bring the film in position in the usual manner. An opening 17 may be provided through which the position of the film, as indicated by the indicia thereon, may be determined. By withdrawing the plate 9 the camera is in condition to expose the film and take a picture in the ordinary way. It will, of course, be understood that the inner frame 7 does not have to be swung outwardly to load the camera, as the same may be left in position and the camera loaded by swinging the outer frame plate outwardly on its hinge 11. When the two inner and outer swinging frames are secured together and the plate 9 in position, it is obvious that the film may be moved into and out of position at will, and indeed if desired may be wholly disconnected from the camera box, though I prefer to hinge the film container to the box in the manner shown.

It is perhaps unnecessary to say that all joints must be made light-tight where same are desired or necessary. The back frame plate is preferably formed with shoulders 18 constituting a recess (though this recess is not necessary, it being provided merely to protect the ground glass frame and avoid corners or projections which might be objectionable where the instrument is carried in the pocket) in which a frame 19 hinged at its lower edge to the camera box 20 is arranged. This frame has pins on its upper free edge (not shown) which coöperate with yielding fastening devices 21 arranged on the top wall of the camera box whereby the frame is held in position. The side members of this frame have leaf springs 22 connected therewith whose ends are connected to the ground glass frame 23 in which is mounted a ground glass or other suitable focusing screen 24. One end of each spring is refolded as at 22ª so as to have a sliding connection with the pin secured to the frame 23 with which it engages, thereby permitting frame 23, when the film frame is swung outwardly, to move inwardly against frame 6; or when the film frame is in position as shown in Fig. 3, leaf spring 22 is flattened and the ground glass rests in the recess between the shoulders 18.

It is the intention that the ground surface of glass 24 when the film frame is swung downwardly and the frame 23 rests against frame 6, shall be coincident with the emulsion surface of the film in order that the camera may be focused correctly either for films or plates. It is, of course, necessary to swing the film frame outwardly before focusing with the ground glass, but before this is done, the plate 9 is slid into position so as to prevent the film being light struck. After focusing with the ground glass, the same may be swung downwardly out of position, the film frame swung into position, the plate 9 removed, and an exposure made on the film; or if desired, to use plates, the film frame may be left in its outer position and a plate holder indicated at 25, Fig. 4, slid into position between frames 23 and 6. The emulsion surface of the plate should, of course, be coincident with the ground surface of the plate 24.

To protect the ground glass 24, I preferably hinge a plate 26 to the upper edge of the frame 19 providing catches 27 at the lower edge of this plate so that the same will be retained in position.

From the above, it will be seen that my improved camera is simple and compact, and that it is possible to focus the same and make an exposure on a film of the camera; or if desired, to use plates, in the manner which is well known.

The ground glass frame when folded over the film container secured in position provides an efficient lock therefor and in no way interferes with making exposures on the film in the usual manner. It is necessary, however, to swing the ground glass carrying frame outwardly to give access to the film container to load and unload the same.

It is obvious that a device incorporating my invention is susceptible of changes and modifications not herein illustrated, and therefore, it is not my intention that my invention be limited to the specific form shown.

What I claim is:

1. In combination with a camera box having a lens mounted thereon, a film container pivotally mounted on the box and movable into and out of exposure position relative to the lens, and means mounted on said box for supporting a plate with its emulsion side in the plane occupied by the emulsion side of a film in the container when the latter is in exposure position.

2. In a device of the class described, a camera box, a film container mounted thereon and foldable into exposure position, a frame mounted on said box and foldable over the film container, and a focusing screen supported on said frame and adapted to occupy the plane occupied by the emulsion side of the film when the film container is in exposure position.

3. In combination, a camera box having a lens supported thereon, a film container pivotally mounted on the camera box, and a focusing screen pivotally mounted on the camera box, said film container and said focusing screen being respectively movable into the same focal relationship with said lens.

4. The combination of a camera box having a lens supported thereon, a film container movably mounted on the camera box, a focusing screen movably mounted on the camera box and foldable over the film container; said focusing screen being movable into the same focal position relative to the lens as is occupied by a film in the film container when the latter is in exposure position.

5. The combination of a camera box having a lens supported thereon, a film container movably mounted on the camera box, a frame movably mounted on the camera box and foldable over the film container when the latter is in exposure position, and means carried by said frame adapted to support a plate holder so that a plate therein occupies the same focal relationship relative to the lens as a film supported in the film container when the latter is in exposure position.

6. The combination of a camera box having a lens supported thereon, a film container movably mounted on said box, a frame movably mounted on said box and adapted to encompass said film container when the latter is in exposure position, and means on said frame adapted to support a plate holder in exposure position relative to said lens.

7. The combination of a camera box having a lens mounted thereon, a frame movably mounted thereon, a focusing screen mounted on said frame and movable thereby into focal relationship with said lens, said frame being adapted when in exposure position to support a plate holder in focal relationship to said lens.

8. A camera box having a lens mounted thereon and having movably mounted thereon a film container, a focusing screen, and a plate holder support, which said parts are foldable into and out of focal relationship with said lens.

9. In a camera the combination with a camera box having a lens mounted thereon, of a focusing screen and a film container mounted on the box and respectively movable into focal relationship with the lens on axes disposed at right angles to each other.

10. In a camera the combination with a camera box having a lens mounted thereon, of a film container and a plate holder support mounted on the box and respectively movable into focal relationship with the lens on axes disposed at right angles to each other.

In testimony whereof I hereunto affix my signature in the presence of two witnesses, this 12th day of November, 1914.

TAKUMA KAJIWARA.

Witnesses:
M. P. SMITH,
M. A. HANDEL.